J. DOLE.
MACHINE FOR MAKING WOODEN GUTTERS.
No. 190,565. Patented May 8, 1877.
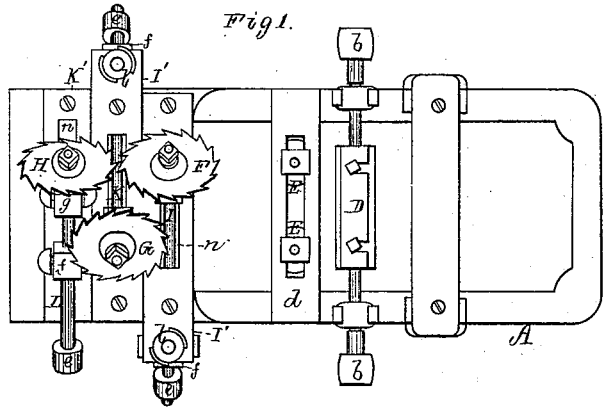
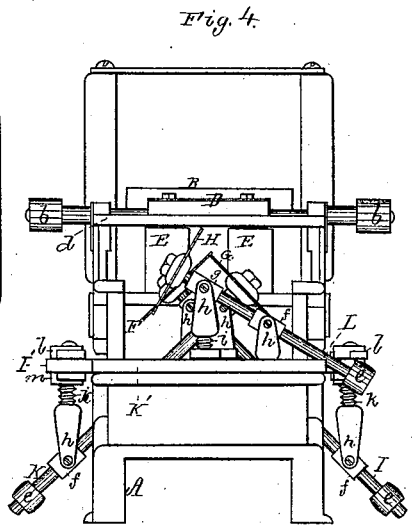
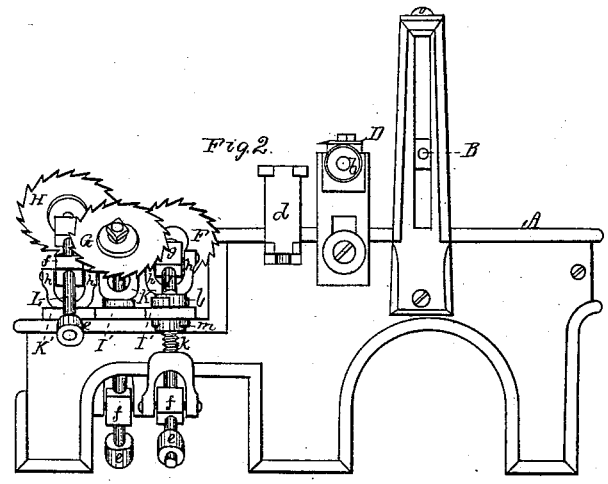
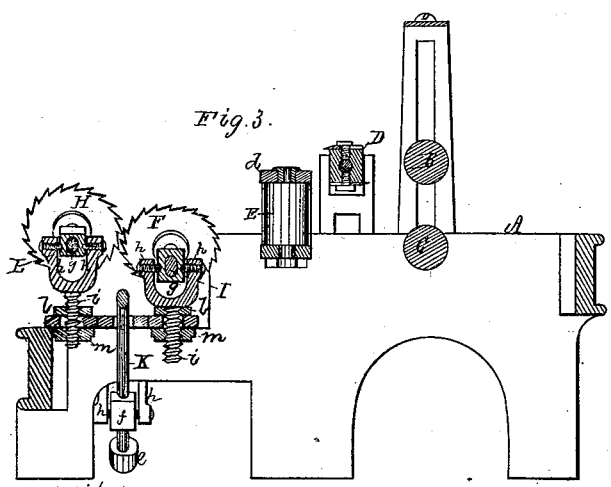
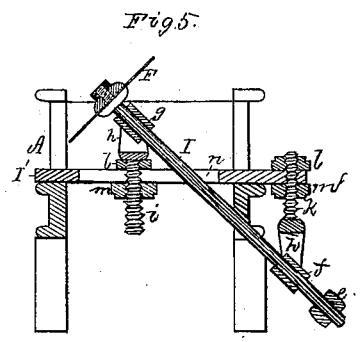
Inventor
John Dole
by his attorney
R. H. Eddy

UNITED STATES PATENT OFFICE.

JOHN DOLE, OF BANGOR, MAINE, ASSIGNOR TO HIMSELF AND HIRAM H. FOGG, OF SAME PLACE.

IMPROVEMENT IN MACHINES FOR MAKING WOODEN GUTTERS.

Specification forming part of Letters Patent No. 190,565, dated May 8, 1877; application filed August 25, 1876.

*To all whom it may concern:*

Be it known that I, JOHN DOLE, of Bangor, of the county of Penobscot and State of Maine, have invented an Improvement in Machines for Making Wooden Gutters; and do hereby declare the same to be fully described in the following specification and represented in the accompanying drawings, of which—

Figure 1 is a top view, Fig. 2 a side elevation, Fig. 3 a longitudinal section, and Fig. 4 a front-end view, of it. Fig. 5 is a transverse section of it, taken through one of its pair of groove-saws.

The machine in question is designed to plane down or reduce a stick of timber on its sap side, to groove it at its opposite side, and also to bevel it on an intermediate side, entirely across it. In fact, the machine grooves the stick on one side only. The reducing cutter wheel or cylinder does not reduce the stick on that side which is to be sawed to form the groove in the stick, but effects a reduction of it on its opposite or sap side.

To perform these operations my machine, though analogous in some respects to, differs materially in its construction from, that described in the United States Patent No. 176,892, dated May 2, 1876, which is for grooving the stick in two sides, and requires four saws therefor; whereas, in carrying out my combination, I dispense with one of such saws and the machinery to run it, and make use of but three saws. In so doing I perform what is not effected by the patented machine—viz., the beveling of the stick entirely across it, and the saving in stock consequent thereto.

My invention may be said to consist, in the main, as follows: first, in the combination of feed-rollers and adjustable gage-rollers with two grooving-saws, having their shafts extending downward and crossing each other, all as hereinafter explained; second, the combination of feed-rollers, adjustable gage-rollers, and a cutter-cylinder, arranged as shown, with a beveling-saw, and with the two grooving-saws, having their shafts extending downward from them and across each other, all as represented; third, the combination for effecting the adjustment of each saw.

In the drawings, A denotes the frame for supporting the main operative parts of the machine. Within such frame there is arranged, as shown, a pair of horizontal feed or guide rollers, B C, to which I usually apply suitable mechanism for operating either or both in a manner to cause the stick to be guided to and moved forward to the cutter-cylinder D, arranged in advance of the feed-rollers, and having fixed on its shaft a driving-pulley, *b*.

In front of the said cylinder is a pair of adjustable and vertical gage-rollers, E E, the bars *c c* of whose journals are arranged in slots in the upper and lower bars of a horizontal frame, *d*, erected on the frame A. Clamp-screws or other suitable devices should be applied to the frame *d*, to fasten the boxes of each roller in any assumed position in their slots.

From the above it will be seen that the gage-rollers not only may be varied in distance asunder, but they may be both moved toward either side of the machine, in order to properly adjust them relatively to the inclined saws.

These saws are what are termed "circular" saws, and are represented at F, G, and H, they being disposed as shown, and fixed to inclined shafts I K L, each of which, at its outer end, is furnished with a driving-pulley, *e*.

Each shaft is supported in two boxes or bearings, *f g*, arranged between and pivoted to the prongs *h h* of two furcated male screws, *i k*, each of which has to it two set-nuts, *l m*. When the two screws are arranged in one slot, and the shaft does not go obliquely through such slot, as is the case with the screws and shaft of the beveling-saw, a shoulder at the base of the prongs of the screw will suffice for one set-nut, all being as shown; but when the shaft goes obliquely through a slotted plate, as represented in the drawings, two set-nuts to each screw are required.

The screws and nuts for each shaft co-operate with one of three plates, I' I' K', extended across the frame A. Each of the said plates has a long slot, *n*, made in it transversely of the machine.

The plates I' I' extend beyond the sides of the frame A, and each has through its extension a hole, to receive one of the adjustment-screws, as shown, the other being extended through the slot of such plate.

The shafts I K run obliquely through the slots of their plates, and have one of their furcated screws projecting above and the other below the plate, in manner as shown.

By means of its appliances either shaft may be more or less inclined, to vary the angle of obliquity of its saw, or may be moved one way or the other transversely of the machine, so as to vary the position of the saw, or adjust it nearer to or farther from one side of the machine, as circumstances may require, to adapt the machine to sticks of different sizes.

The gage-rollers guide the stick suitably to the saws, which, in their operation, reduce it to a trapezoidal shape in transverse section, and bevel it on one side, and cut it so as to remove from it a strip triangular in cross-section, thereby leaving the stick with a groove in one side only. The stick is subsequently to be finished by molding and grooving machinery, such as will further reduce it, as may be required, to make of it a gutter.

By my arrangement of the grooving-saws F G and their shafts, with the feed-rollers and the adjustable gage-rollers, I am enabled to groove a stick of timber on its lower side, and thereby cause, by the force of gravity, the part or strip removed from it by the saws to fall or be drawn away from them while they may be cutting the stick. When the saws are arranged to operate on the upper side of the stick, it will readily be seen that the piece removed will, as it is formed, fall into the groove, and more or less bind or pinch the saws, and prevent the escape of the sawdust. With my improvement there is no such binding or pinching of the saws, and the sawdust can be easier discharged. With my said improvement the shafts of the grooving-saws have to be extended downward, and arranged so as to cross each other, in manner as shown in Fig. 4. The shaft L of the saw H is also extended downward, such arrangement of it being productive of advantage. The saw H cuts entirely across the stick, and thus the necessity of a fourth saw to co-operate with the said saw H in trimming the stick for the molding of it is avoided, thereby saving the cost of such saw and its necessary fixtures, and also, in the working of the machine, the power and cost of operating such a saw.

I am aware of the Patents Nos. 10,395, 63,572, and 176,892, and hereby disclaim the constructions therein shown and described, especially that of the last mentioned of such patents, by which a stick, while being sawed, is grooved on two sides by means of four saws.

In my said machine I claim as my invention as follows:

1. The feed-rollers B C, the adjustable gage-rollers E E, and the two grooving-saws F G, arranged as shown, in combination with the saw-shafts K L, mounted in pivoted and adjustable bearings, and extending downward and crossing each other, as represented, whereby a piece of timber, while being sawed by such saws, becomes grooved on its lower side, and the saws are relieved by gravity from the pressure of the strip while it may be in the process of removal from the stick by them, (the said saws.)

2. The feed-rollers B C, the reducing cutter-cylinder D, and the gage-rollers E E, arranged as shown, in combination with the beveling-saw H and the grooving-saws F G, and with their shafts K L, mounted in pivoted and adjustable bearings, and extended downward and crossing each other, as represented.

3. The combination for effecting the adjustment, as described, of each saw and its shaft, such consisting in the slotted plate I' or K', and the furcated screws $i$ $k$ and their clamping devices or nuts $l$ $m$, and the boxes $f$ $g$, pivoted to such screws, all being substantially as specified and represented.

JOHN DOLE.

Witnesses:
 DANIEL SANBORN,
 GEO. E. DOLE.